(12) United States Patent
Kang et al.

(10) Patent No.: US 9,109,885 B2
(45) Date of Patent: Aug. 18, 2015

(54) OPTICAL SENSOR AND SENSING METHOD USING THE SAME

(75) Inventors: Sung Chul Kang, Seoul (KR); Du Gan Um, Seoul (KR); Dong Seok Ryu, Seoul (KR); Gi-Hun Yang, Gongju-si (KR)

(73) Assignees: Korea Institute of Science and Technology, Seoul (KR); Dinast, Corpus Christi, TX (US)

( * ) Notice: Subject to any disclaimer, the term of this patent is extended or adjusted under 35 U.S.C. 154(b) by 110 days.

(21) Appl. No.: 13/407,166

(22) Filed: Feb. 28, 2012

(65) Prior Publication Data
US 2012/0229789 A1  Sep. 13, 2012

(30) Foreign Application Priority Data

Mar. 10, 2011 (KR) .......................... 10-2011-0021331

(51) Int. Cl.
*G01C 3/08* (2006.01)
(52) U.S. Cl.
CPC ........................................ *G01C 3/08* (2013.01)
(58) Field of Classification Search
CPC ............. G01C 3/08; G01B 11/25; G01B 7/32; G06T 7/408
USPC ........................................................ 356/4.07
See application file for complete search history.

(56) References Cited

U.S. PATENT DOCUMENTS

| 7,389,041 | B2 * | 6/2008 | Gindele et al. ................... 396/98 |
| 7,538,813 | B2 * | 5/2009 | Wernersson ................... 348/345 |
| 7,646,976 | B2 * | 1/2010 | Kurosawa ....................... 396/213 |
| 2007/0171452 | A1 * | 7/2007 | Matsunoshita ............... 358/1.14 |
| 2011/0102581 | A1 * | 5/2011 | Nakamura et al. ............ 348/135 |

FOREIGN PATENT DOCUMENTS

| JP | 2001-356004 A | 12/2001 |
| JP | 2003-296721 A | 10/2003 |
| KR | 10-0265495 B1 | 9/2000 |

* cited by examiner

*Primary Examiner* — Luke Ratcliffe
*Assistant Examiner* — Vicente Rodriguez
(74) *Attorney, Agent, or Firm* — Fenwick & West LLP

(57) ABSTRACT

The optical sensor according to an embodiment disclosed herein includes: a lighting unit; a color photographing element for obtaining a color image in the sensing region; a photographing control unit for controlling a light irradiating time; a memory unit for storing a color image and a resultant image; a measurement light image extracting unit for processing the color image or the resultant image; a distance calculating unit for calculating distance or location information of the object; and a color correcting unit for calculating corrected distance or location information of the object.

10 Claims, 6 Drawing Sheets

OPTICAL SENSOR AND SENSING METHOD USING THE SAME

CROSS-REFERENCE TO RELATED APPLICATION

This application claims priority to Korean Patent Application No. 10-2011-0021331, filed on Mar. 10, 2011, and all the benefits accruing therefrom under 35 U.S.C. §119, the contents of which in its entirety are herein incorporated by reference.

BACKGROUND

1. Field

The present disclosure relates to an optical sensor for measuring a distance or location and a sensing method using the same, and more particularly, to an optical sensor capable of sensing a distance or location of an article in a more precise and accurate way by correcting the difference in radiance caused by the surface color of the article when the optical sensor detects the intensity of radiation of a measurement light irradiated to and reflected on a sensing region to measure the distance of the article, and a sensing method using the same.

2. Description of the Related Art

To measure an object or obstacle at a short distance, sensors, particularly sensors using an infrared (IR) lighting, for irradiating a measurement light to a sensing region and measuring a reflected light to determine the presence of an object or obstacle in the sensing region are commonly used in industry.

Recently, a technique of measuring a location of an article by obtaining an IR lighting image with an image photographing element has been developed.

In a method of sensing an object at a short distance by using the above technique, a certain amount of light is firstly irradiated to a sensing region by using a photometric light, then a returning light reflected on the object existing in the sensing region is filtered by an IR lighting filter, and then a lighting image is obtained by means of a photographing element. Subsequently, the obtained IR lighting image is analyzed to find a location of an object or obstacle existing in the sensing region.

However, this technique has a limit in that an accurate distance cannot be calculated since the radiant of the IR light is changed by the surface material or color of the object. For example, even though a red object and a blue object are located at the same distance from the sensor, the red object may be erroneously measured to be closer since a relatively greater radiant of the IR light is reflected on the red object.

Therefore, this technique has a limit in that a measurement distance has an error due to the difference in radiant of a measurement light according to the surface color of an object.

SUMMARY

The present disclosure is directed to providing an optical sensor capable of accurately measuring a distance to an object existing in a sensing region by correcting the difference in radiant due to the surface color of the object, and a sensing method using the same.

In one aspect, there is provided an optical sensor for irradiating a measurement light into a sensing region to sense an object in the sensing region, the optical sensor including: a lighting unit for irradiating a measurement light to the sensing region; a color photographing element for obtaining a color image in the sensing region in response to an incident light from the sensing region; a photographing control unit for controlling a light irradiating time when the lighting unit irradiates a measurement light and a photographing time when the color photographing element obtains a color image; a memory unit for storing a color image obtained by the color photographing element and a resultant image obtained by preprocessing the color image; a measurement light image extracting unit for processing the color image or the resultant image stored in the memory unit to separate and extract a measurement light image that is an image formed by the returning measurement light of the lighting unit which is reflected on the object; a distance calculating unit for calculating distance or location information of the object from the measurement light image extracted by the measurement light image extracting unit; and a color correcting unit for calculating corrected distance or location information of the object by adding the distance or location information of the object calculated by the distance calculating unit and a correction value according to color information of the object photographed by the color photographing element.

The lighting unit may be a white light source, a red light source, a halogen lamp, an ultraviolet (UV) light source, an infrared (IR) lighting or a light emitting diode (LED).

The color photographing element may be a charge-coupled device (CCD) or a complementary metal-oxide semiconductor (CMOS).

The color image stored in the memory unit may include a lighting color image obtained through the color photographing element in a state when the lighting unit irradiates light, and a non-lighting color image obtained through the color photographing element in a state when the lighting unit does not irradiate light.

The resultant image stored in the memory unit may be obtained by preprocessing for converting the color image into an intensity image (grayscale) and may include a lighting intensity image converted from the lighting color image and a non-lighting intensity image converted from the non-lighting color image.

The color correcting unit may calculate the correction value based on the level of contribution of each of red color, green color and blue color in a pixel of the color image stored in the memory unit with respect to the returning measurement light of the lighting unit In another aspect, there is provided a sensing method using an optical sensor that includes a lighting unit for irradiating light to a sensing region, a color photographing element for obtaining a color image in the sensing region, and a photographing control unit for controlling a light irradiating time of the lighting unit and a photographing time of the color photographing element, the sensing method including: obtaining a non-lighting color image in the sensing region through the color photographing element in a state when the lighting unit is controlled not to irradiate light; obtaining a lighting color image in the sensing region through the color photographing element in a state when the lighting unit is controlled to irradiate light; extracting just a measurement light image formed by only a returning measurement light irradiated by the lighting unit and then reflected on an object in the sensing region by means of comparative operation of the obtained color images by the measurement light image extracting unit; calculating a location of the object in the sensing region by processing the extracted measurement light image by a distance calculating unit; and calculating corrected location information of the object by adding the location of the object calculated by the distance calculating unit and a correction value according to color information of the object photographed by the color photographing element.

The process of extracting a measurement light image may further include converting the non-lighting color image and the lighting color image into a non-lighting intensity image and a lighting intensity image, respectively, and then performing comparison operation with respect to the non-lighting intensity image and the lighting intensity image by means of the measurement light image extracting unit.

The process of extracting a measurement light image may include performing comparison operation with respect to the obtained non-lighting color image and the obtained lighting color image by subtraction.

The processes of calculating a location of the object may further include analyzing the intensity of reflected light of the extracted measurement light image to calculate distance information between the optical sensor and an object in the sensing region.

The processes of calculating corrected location information of the object may further include adding the extracted distance information between the optical sensor and the object and a correction value according to color information of the object photographed by the color photographing element to calculate the corrected distance information of the object.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
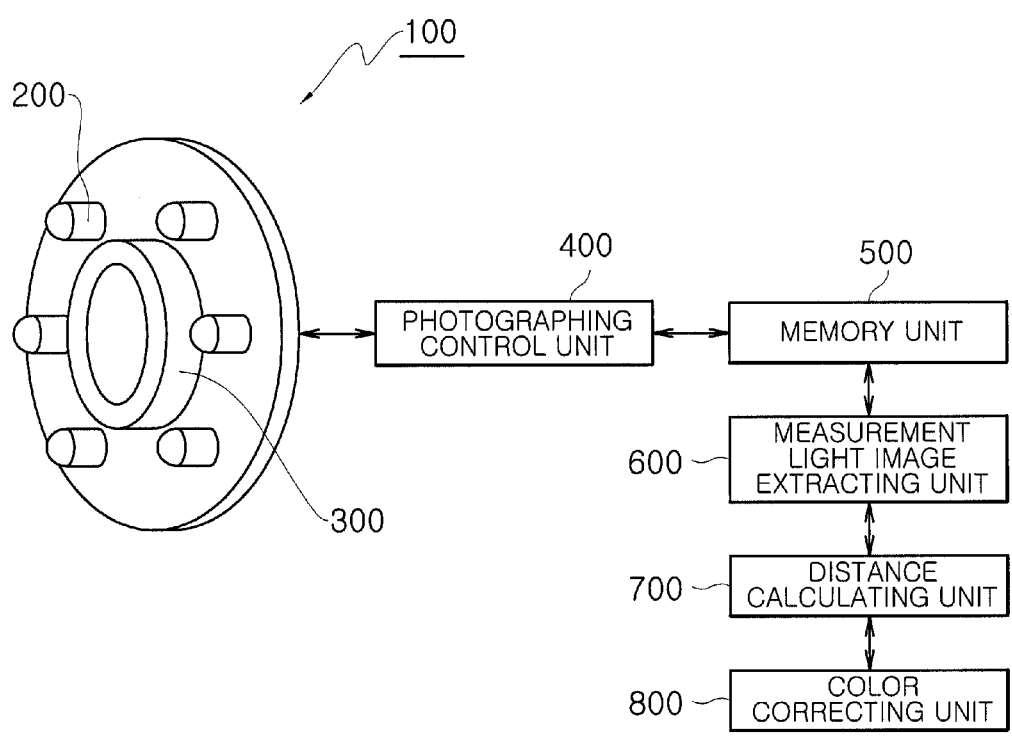
FIG. 1 is a schematic view showing an optical sensor according to one embodiment disclosed herein.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Hereinafter, an optical sensor and a sensing method using the same according to a preferred embodiment will be described in detail with reference to the accompanying drawings.

FIG. 1 is a schematic view showing an optical sensor according to one embodiment disclosed herein.

Referring to FIG. 1, an optical sensor 100 disclosed herein includes a lighting unit 200, a color photographing element 300, a photographing control unit 400, a memory unit 500, a measurement light image extracting unit 600, a distance calculating unit 700 and a color correcting unit 800.

The lighting unit 200 irradiates light to sense an object in a sensing region. The lighting unit 200 may use any kind of lighting that irradiates light in a wavelength range detectable by the color photographing element 300, such as a white light source, a red light source, a halogen lamp, an ultraviolet (UV) light source, an infrared (IR) lighting and an light emitting diode (LED). At this time, if just a light having UV or IR lighting wavelengths is used, the optical sensor 100 may be operated without visually disturbing a user by preventing dazzling.

The color photographing element 300 obtains a color image in the sensing region in response to the incident light from the sensing region of the optical sensor 100. The color photographing element 300 photographs an image of the returning measurement light irradiated to the sensing region by the lighting unit 200 and then reflected on an object, or obtains a color image in the sensing region of the optical sensor 100 in a state when the lighting unit 200 does not operate.

The kind of the color photographing element 300 is not specially limited, and an image collecting element capable of distinguishing the color of an object and photographing an image in response to a measurement light is used. Representatively, the color photographing element 300 is a charged-coupled device (CCD) or a complementary metal-oxide semiconductor (CMOS). In addition, the color photographing element 300 may use an element that is sensitive to a wavelength range of the measurement light irradiated by the lighting unit 200.

The photographing control unit 400 controls an irradiating time when the lighting unit 200 irradiates a measurement light and a photographing time when the color photographing element 300 photographs an image to obtain various color images in the sensing region.

The optical sensor 100 disclosed herein may obtain a non-lighting color image 30 photographed by the color photographing element 300 in a state when the lighting unit 200 does not irradiates a measurement light and may obtain a lighting color image 40 photographed by the color photographing element 300 in a state when the lighting unit 200 irradiates a measurement light.

The memory unit 500 stores the image photographed by the color photographing element 300 or an image obtained by processing the above image. In detail, the memory unit 500 stores the non-lighting color image 30 photographed in a state when the lighting unit 200 does not irradiates a measurement light or the lighting color image 40 photographed in a state when the lighting unit 200 irradiates a measurement light. In addition, the memory unit 500 may store resultant images obtained by processing the non-lighting color image 30 or the lighting color image 40 in various ways as described later.

The measurement light image extracting unit 600 performs comparison operation with respect to the non-lighting color image 30 obtained when the lighting unit 200 does not irradiates a measurement light and the lighting color image 40 obtained when the lighting unit 200 irradiates a measurement light, among the images stored in the memory unit 500, to extract a measurement light image 50 purely generated by the measurement light of the lighting unit 200 while excluding any effects caused by an external light source.

In order to accurately sense an object 10 existing in the sensing region, an effect caused by an external light source 20 should be excluded, and the measurement light irradiated by the lighting unit 200 and reflected on the object should be separated and extracted. The non-lighting color image 30 contains just reflected light information purely by the external light source 20, and the light color image 40 contains both of the information caused by external light source 20 and the information caused by the measurement light of the lighting unit 200. Therefore, if the non-lighting color image 30 and the lighting color image 40 are analyzed, the measurement light image 50 of the measurement light generated by the lighting unit 200 and reflected on the object may be purely extracted without any effects caused by the external light source 20. It will be described in more detail with reference to FIGS. 2 and 3.

Figure 2:
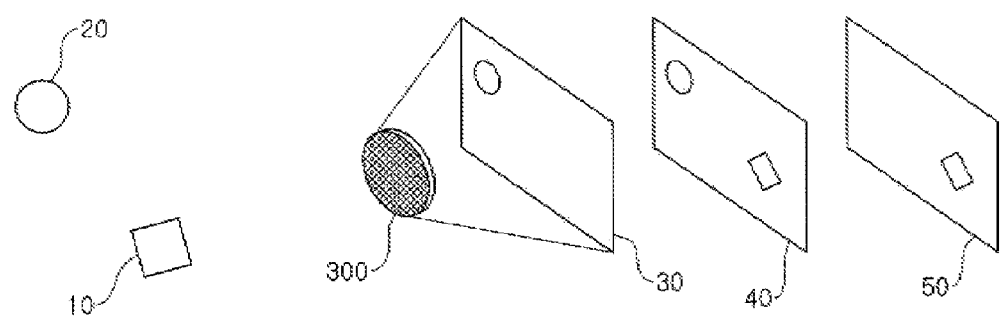
FIGS. 2 and 3 are schematic views for illustrating a process of obtaining a measurement light image using the optical sensor disclosed herein.
Figure 3:
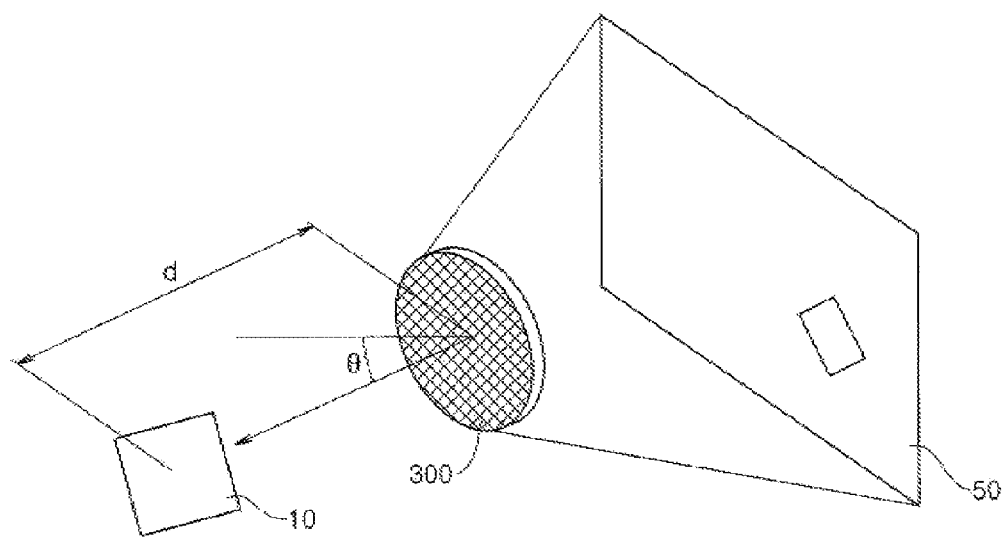

FIGS. 2 and 3 are schematic views for illustrating a process of obtaining a measurement light image using the optical sensor disclosed herein.

Referring to FIG. 2, the non-lighting color image 30 obtained by the color photographing element 300 in a state when the lighting unit 200 does not irradiates light contains image information caused by the external light source 20.

In addition, the lighting color image 40 obtained by the color photographing element 300 in a state when the lighting unit 200 irradiates light contains not only image information caused by the external light source 20 but also image information of the returning measurement light irradiated by the lighting unit 200 and then reflected on an object 10 at a short distance.

Therefore, by performing comparison operation with respect to the lighting color image 40 obtained in a state when the lighting unit 200 irradiates light and the non-lighting color image 30 obtained in a state when the lighting unit 200 does not irradiate light, an influence of the external light source 20 may be removed, and the measurement light image 50 containing just the image information caused by the lighting unit 200 may be obtained. The comparison operation may use various methods such as subtraction or exclusive OR.

In addition, in the comparative operation, not only the color images 30 and 40 which are the originals photographed by the color photographing element 300 but also resultant images obtained by suitably processing the original images may be used.

In one embodiment disclosed herein, the color images 30 and 40 which are the originals photographed by the color photographing element 300 are firstly converted into intensity images, and then subtraction is performed in order to facilitate distance calculation and correction in the future.

If the color image photographed by the optical sensor 100 disclosed herein is converted into an intensity image (grayscale), a non-lighting intensity image converted from the non-lighting color image 30 and a lighting intensity image converted from the lighting color image 40 may be obtained as a result. The images preprocessed as above may be stored in the memory unit 500 so that the images may be used easily in the further process.

When converting the color image into an intensity image, various intensity converting equations may be used for various color models. As for an RGB color model, the following converting equation is representatively used. Even when an HSV color model is used, an equation similar to the following equation may be used. In addition, the following equation and other various converting equations may be defined and used for the same color model.

$$\text{GrayImage} = \text{Red}*0.299 + \text{Green}*0.587 + \text{Blue}*0.114 \qquad \text{Equation 1}$$

Referring to FIG. 1 again, the distance calculating unit 700 converts the intensity of light reflected on the object existing in the sensing region into a distance based on the measurement light image 50 to calculate a distance or location of the object. At this time, a distance to the object 10 to which the measurement light is irradiated may be calculated using the following equation.

$$\text{Intensity of Returning Light} \approx 1/\text{distance}^2 \qquad \text{Equation 2}$$

A method for removing the image information caused by the external light source 20 and analyzing the measurement light image 50 containing just the image information of the returning measurement light generated by the lighting unit 200 and then reflected on the object to calculate a distance or location of the object 10 in the sensing region will be described in detail with reference to FIG. 3.

Referring to FIG. 3, the measurement light irradiated to the sensing region by the lighting unit 200 is reflected on the object 10 existing at a short distance and input to the color photographing element 300. The intensity of light reflected on the object 10 has correlations with the color of the object 10, the reflecting direction from the object 10, the material of the object 10, the distance between the object 10 and the optical sensor 100, and so on.

Therefore, if the information recorded in each pixel of the color photographing element 300 is analyzed, various kinds of information of the object 10 existing in the sensing region may be obtained. Since the intensity of light reflected on the object 10 is generally reversely proportional to the square of the distance, the distance d between the optical sensor 100 and the object 10 may be obtained from the intensity of light recorded in each pixel.

Further, if the coordinate of a pixel where a reflected light is recorded is analyzed in consideration of pixel conditions of the color photographing element 300 and lens effects of the color photographing element 300, a direction θ of the object 10 with respect to the optical sensor 100 may be calculated.

As a result, a relative location between the optical sensor 100 and the object 10 in a 3-dimensional space may be calculated.

Referring to FIG. 1 again, the color correcting unit 800 calculates a corrected distance or location of an object by adding the calculated distance or location of the object and a correction value obtained in consideration of the color of the object.

Since the intensity of reflected light is generally changed according to a distance of the object 10, the distance calculating unit 700 calculates a distance based on the correlation between the distance and the reflected light. However, the calculated distance is influenced by not only the distance of the object 10 but also the color of the object 10, the reflecting direction from the object 10 and the surface material of the object 10. Therefore, the color correcting unit 800 may calculate a more accurate measurement value by correcting the distance or location of the object according to the color of the object.

The measurement light of the lighting unit 200 generally includes lights of various frequencies, and the color of the object means that a light in a specific frequency range is reflected well. For example, in a case where a green light is used as the measurement light, a green object reflects a greater amount of light. Therefore, in a case where objects of various colors are located at the same distance, if the distance is calculated only using the intensity of reflected light, an object which better reflects lights in a dominant frequency range of the measurement light may be erroneously measured to be closer. In addition, since the color photographing element 300 has different sensitivities with respect to frequency ranges of the light with various spectrums, three elements, i.e. the frequency spectrum of the measurement light, the color of the object and the sensitivity of the color photographing element 300 according to each frequency should be considered in order to measure a distance more accurately using the reflected light.

The characteristics of the lighting unit 200 and the color photographing element 300 of the optical sensor 100 are given. Therefore, if the color of the object at a short distance may be checked, the difference in intensity of the reflected light according to a frequency range (color) may be corrected. The color of the object may be checked using the color photographing element 300. Therefore, the corrected distance value according to the color may be calculated by utilizing color information of the image stored in the memory unit 500.

In one embodiment disclosed herein, a correction value according to each distance is measured in advance and stored as an equation through experiments about three objects with red, green or blue color. After that, the correction value according to the color of the object is added with a value obtained by converting the measurement light information of each pixel in an actual sensing process into a distance, thereby calculating a more accurate distance value.

It will be described in more detail based on one experimental example.

Figure 4:
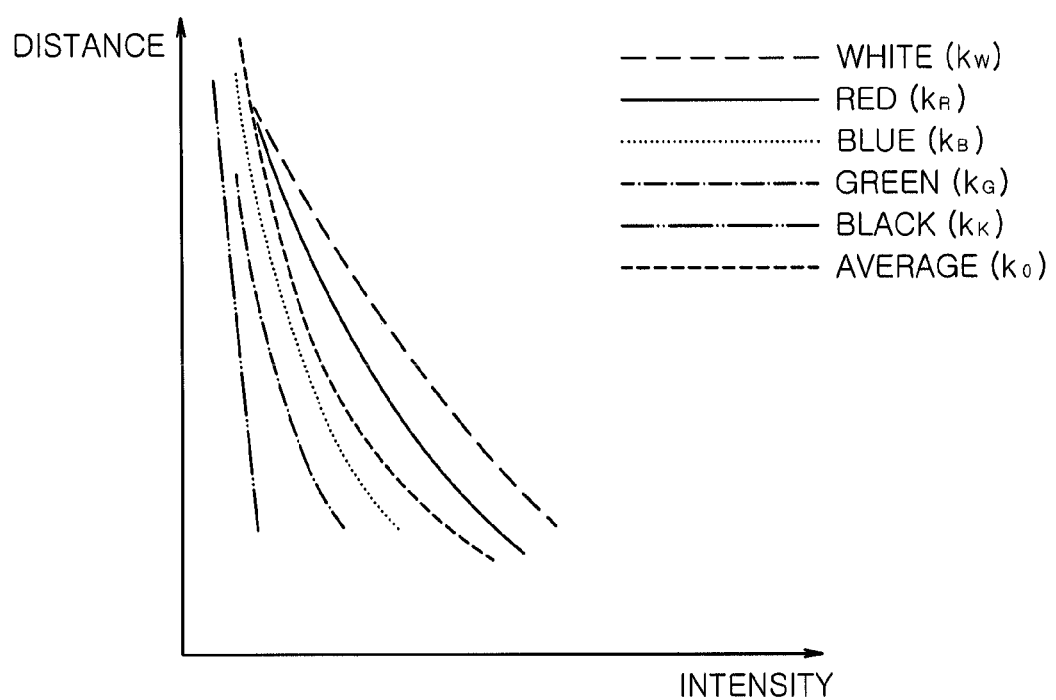
FIG. 4 is a graph showing the change of the intensity of reflected light with respect to a distance according to the color of an object.

FIG. 4 is a graph showing the change of intensity of a reflected light with respect to a distance according to the color of an object.

In FIG. 4, experimental results on the change of intensity of a reflected light according to a distance are shown with respect to five objects having red, green, blue, white and black colors, respectively. The intensity of reflected light decreases along with the distance, and it could be found that the intensity slightly varies depending on the color. The correlation between the intensity of reflected light x and the distance y may be approximated as in the following equation.

$$y = k * x^{-(1/2)}$$  Equation 3

Referring to FIG. 4, it could be understood that the constant k varies according to the color. In general, the intensity of reflected light x0 is substituted into an equation to which an average constant k0 is applied to be converted into a distance y0. In this disclosure, the level of contribution of each of red, green and blue colors in the reflected light are reflected based on the color information of RGB (red xR, green xG, blue xB) contained in a pixel of the color image stored in the memory unit 500. A corrected distance according to each color is as follows.

$$y_{adj,R} = (k_R - k_0) * x_R^{-(1/2)}$$

$$y_{adj,G} = (k_G - k_0) * x_G^{-(1/2)}$$

$$y_{adj,B} = (k_B - k_0) * x_B^{-(1/2)}$$  Equation 4

If the corrected distance is corrected as much as the degree of contribution on the entire intensity of light, an accurate distance value of the object may be calculated. A final distance value corrected based on the color of the object is as follows.

$$y_{adj} = y_0 + (y_{adj,R} + y_{adj,G} + y_{adj,B})$$  Equation 5

Figure 5:
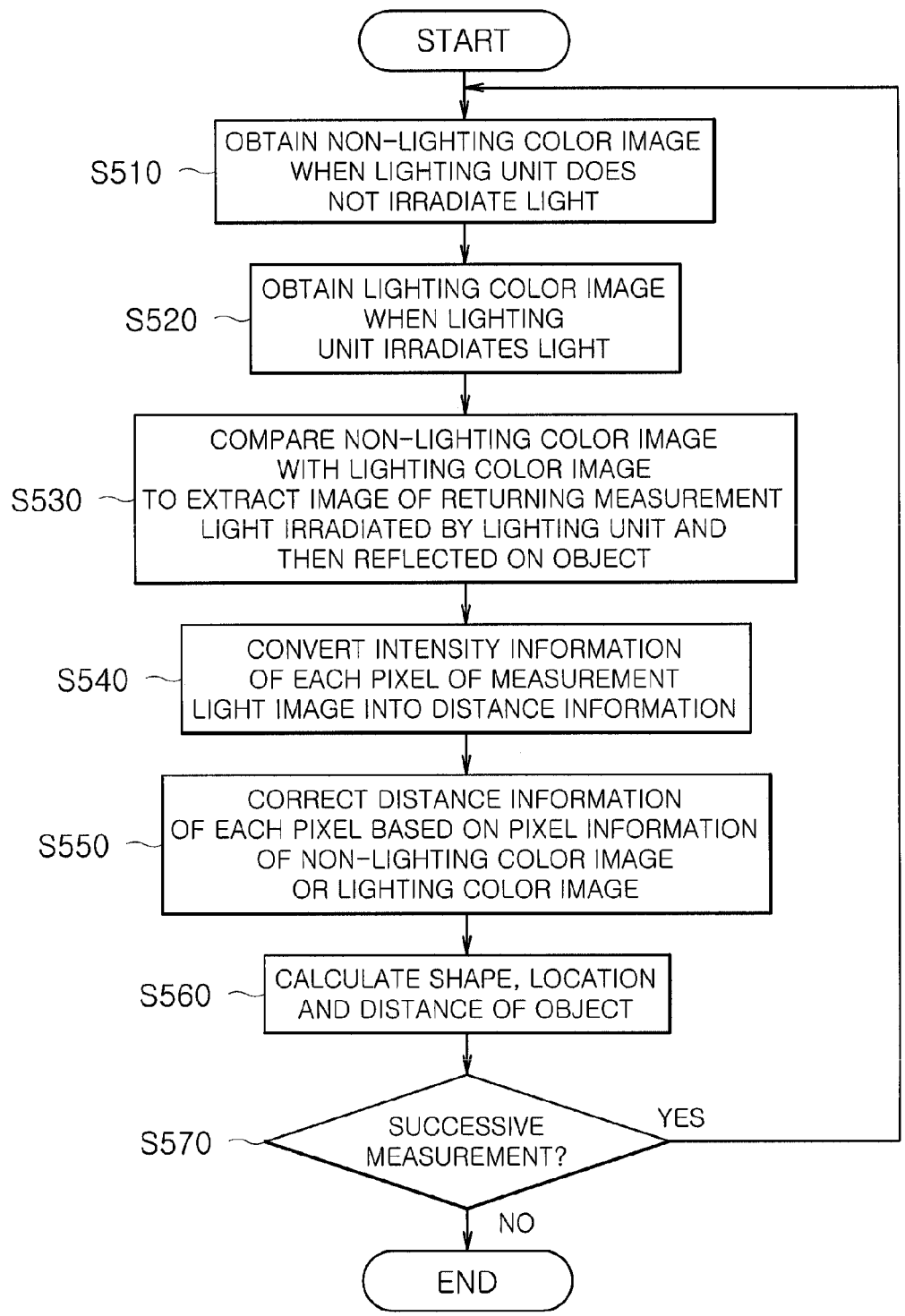
FIG. 5 is a flowchart illustrating a sensing method using the optical sensor according to one embodiment disclosed herein.

FIG. 5 is a flowchart illustrating a sensing method using the optical sensor according to one embodiment disclosed herein.

Referring to FIG. 5, in a state when the lighting unit 200 is controlled not to irradiate a measurement light, the non-lighting color image 30 caused by the external light source 20 is obtained by means of the color photographing element 300 (S510). When actually operating the optical sensor 100 disclosed herein, even though the lighting unit 200 irradiates light in S510 due to any erroneous control, the sensing result may be substantially not influenced if the irradiating time is relatively shorter than the photographing time of the color photographing element 300.

Subsequently, in a state when the lighting unit 200 is controlled to irradiate a measurement light, the lighting color image 40 is obtained by means of the color photographing element 300 (S520). The lighting color image 40 obtained in S520 includes image information caused by the external light source 20 and image information caused by the lighting unit 200.

The S510 and S520 may be executed in a reverse order. In addition, a gap between the photographing time of the color photographing element 300 when the lighting unit 200 does not irradiates light and when the lighting unit 200 irradiates light may be minimized so as to minimize the difference in time of executing the S510 and S520.

Then, the color images 30 and 40 obtained in the S510 and S520 are comparatively operated by means of the measurement light image extracting unit 600 to extract just the measurement light image 50 of the returning measurement light irradiated by the lighting unit 200 and then reflected on the object 10 in the sensing region (S530). At this time, various kinds of preprocessing may be performed to the original color images 30 and 40 for the comparison operation. For example, in one embodiment, the color images are converted into intensity images and then comparatively operated to facilitate calculation of a distance value in the future. In addition, the comparison operation may use subtraction as described above.

Subsequently, the distance calculating unit 700 converts the intensity information stored in each pixel of the extracted measurement light image 50 into distance information. As described above, the intensity information of each pixel is reversely proportional to a distance of an object existing at the corresponding location, and the intensity information of each pixel may be converted into distance information using the equations 1 to 3.

Since the correlation characteristics between the intensity of light and the distance are changed according to the features of the used lighting unit 200 and color photographing element 300 and the controlled irradiating and photographing times, a constant value is measured by experiments. As a result, the intensity information of a pixel of the measurement light image 50 is analyzed to calculate basic distance or location information of the object 10 existing in the sensing region (S540).

Subsequently, the color correcting unit 800 extracts color information of each pixel from the non-lighting color image 30 or the lighting color image 40 and calculates a distance correction constant for the corresponding pixel in order to correct the distance information of each pixel converted by the distance calculating unit 700 (S550). The corrected distance value of each pixel to which the color of each pixel is reflected may be calculated using the equation 4. As a result, a distance value of the pixel at which the object 10 existing in the sensing region is photographed may be analyzed to obtain an average distance of the object 10, and the coordinate of the pixel at which the object 10 is photographed may be analyzed to calculate a shape or location of the object (S560).

Then, in a case where it is intended to successively measure the object 10 in the sensing region, the above steps are repeated. If not, the measurement is completed (S570).

Figure 6:
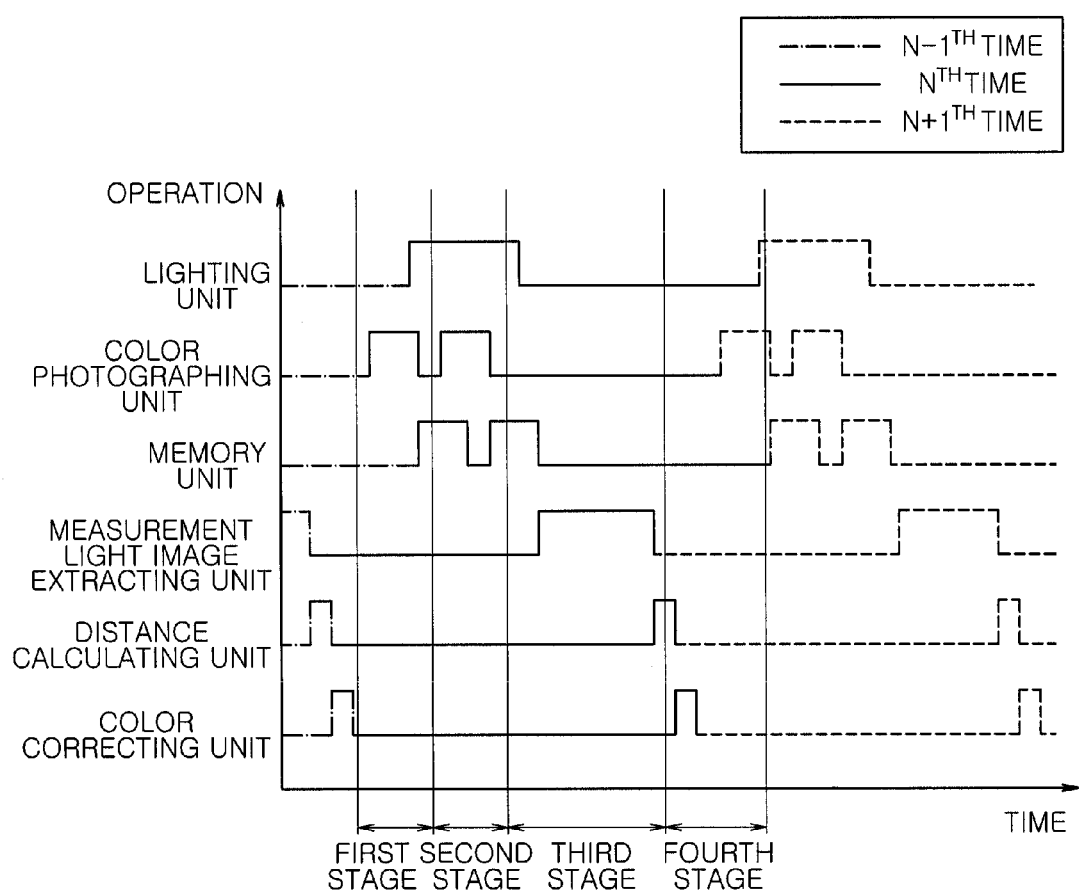
FIG. 6 is a graph illustrating a method of operating the optical sensor according to the flowchart of FIG. 5.

FIG. 6 is a graph illustrating a method of operating the optical sensor according to the flowchart of FIG. 5.

In FIG. 6, the first stage, the second stage, the third stage and the fourth stage depicted in the longitudinal axis represent stages arbitrarily classified according to time intervals at which each element of the optical sensor 100 is operated, and the order of the stages or their time intervals may be changed.

Seeing the operation of the optical sensor 100 at a Nth time with reference to FIG. 6, the lighting unit 200 is operated according to a control signal of the photographing control unit 400 and irradiates light mainly in the second stage.

The color photographing element 300 is operated according to a control signal of the photographing control unit 400 mainly in the first and second stages. The irradiating time of the lighting unit 200 has close relation with the photographing time of the color photographing element 300.

In other words, in the first stage, in order to obtain the non-lighting color image 30 in a state when the lighting unit 200 does not irradiate light, the color photographing element 300 photographs a sensing region during a time interval when the lighting unit 200 does not irradiate light. After that, in the second stage, the color photographing element 300 photographs the sensing region in a state when the lighting unit 200 irradiates light. The first stage and the second stage may be executed in a reverse order.

The memory unit 500 stores the color images 30 and 40 obtained by the color photographing element 300 if the photographing time of the color photographing element 300 ends.

In the third stage, the measurement light image extracting unit 600 preprocesses and performs comparison operation with respect to the color images 30 and 40 stored in the memory unit 500 to extract the measurement light image 50 caused by just the lighting unit 200.

After that, the distance calculating unit 700 analyzes the measurement light image 50 extracted in the third stage to calculate a distance or location of the object 10 in the sensing range. At this time, the measured distance is a distance value estimated based on only the intensity information with no consideration of the color of the object.

Then, the color correcting unit 800 calculates a distance correction constant by means of the color information of each pixel from the non-lighting color image 30 or the lighting color image 40 stored in the memory unit 500 and then corrects the distance value of each pixel so that the pixel at which the object 10 existing in the sensing region may be analyzed to calculate an average distance of the object 10.

The object 10 in the sensing region may be successively measured by the aforementioned four steps repeatable for a realtime operation. In this case, an operating cycle of the optical sensor 100 may be minimized by initiating a first stage of a N+1th time before the fourth stage of the Nth time completely finishes.

By the above processes, the optical sensor 100 disclosed herein may remove the image information caused by the external light source 20 and extract only the image information of the returning measurement light irradiated by the lighting unit 200 and then reflected on the object 10. In addition, a distance or location of the object may be calculated more accurately by correcting a distance value of the object in consideration of the color of the object based on the image information.

The optical sensor and the sensing method using the same disclosed herein allow a distance or location of an object existing in a sensing region to be accurately calculated since an error caused by the difference in radiant of a measurement light according to the surface color of the object may be removed.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

REFERENCE NUMERALS

10: object
20: external light source
30: non-lighting color image
40: lighting color image
50: measurement light image
100: optical sensor
200: lighting unit
300: color photographing element
400: photographing control unit
500: memory unit
600: measurement light image extracting unit
700: distance calculating unit
800: color correcting unit

What is claimed is:
1. An optical sensor comprising:
 a lighting unit for irradiating a measurement light to a sensing region;
 a color photographing element for obtaining a color image in the sensing region in response to an incident light from the sensing region;

a photographing control unit for controlling a light irradiating time when the lighting unit irradiates a measurement light and a photographing time when the color photographing element obtains a color image;

a memory unit for storing a color image obtained by the color photographing element and a resultant image obtained by preprocessing the color image, the color image stored in the memory unit including a lighting color image obtained through the color photographing element in a state when the lighting unit irradiates light and a non-lighting color image obtained through the color photographing element in a state when the lighting unit does not irradiate light;

a measurement light image extracting unit for processing the color image or the resultant image stored in the memory unit, the measurement light image extracting unit configured to extract a measurement light image purely generated by the measurement light of the lighting unit while excluding irradiation not from the lighting unit based on a comparison of the lighting color image to the non-lighting color image; and a distance calculating unit for converting light intensity information of each pixel of the extracted measurement light image into distance information of each pixel, wherein a relative location between the optical sensor and an object in the sensing region is calculated by analyzing a coordinate of each pixel.

2. The optical sensor according to claim 1, wherein the lighting unit is a white light source, a red light source, a halogen lamp, an ultraviolet (UV) light source, an infrared (IR) lighting or an light emitting diode (LED).

3. The optical sensor according to claim 1, wherein the color photographing element is a charge-coupled device (CCD) or a complementary metal-oxide semiconductor (CMOS).

4. The optical sensor according to claim 1, wherein the resultant image stored in the memory unit is obtained by preprocessing for converting the color image into an intensity image (grayscale) and includes a lighting intensity image converted from the lighting color image and a non-lighting intensity image converted from the non-lighting color image.

5. The optical sensor according to claim 1, further comprising a color correcting unit that calculates a correction value based on a level of contribution of each of red color, green color and blue color to the measurement light image from RGB color information contained in a pixel of the color image stored in the memory unit.

6. A sensing method using an optical sensor that includes a lighting unit for irradiating light to a sensing region, a color photographing element for obtaining a color image in the sensing region, and a photographing control unit for controlling a light irradiating time of the lighting unit and a photographing time of the color photographing element, the sensing method comprising:

obtaining a non-lighting color image in the sensing region through the color photographing element in a state when the lighting unit is controlled not to irradiate light;

obtaining a lighting color image in the sensing region through the color photographing element in a state when the lighting unit is controlled to irradiate light;

extracting a measurement light image formed by comparing the lighting color image to the non-lighting color image and excluding irradiation not from the lighting unit; and converting light intensity information of each pixel of the extracted measurement light image into distance information of each pixel, wherein a relative location between the optical sensor and an object in the sensing region is calculated by analyzing a coordinate of each pixel.

7. The sensing method according to claim 6, wherein the process of converting light intensity information further includes converting the non-lighting color image and the lighting color image into a non-lighting intensity image and a lighting intensity image, respectively, and then performing comparison operation with respect to the non-lighting intensity image and the lighting intensity image by the measurement light image extracting unit.

8. The sensing method according to claim 6, wherein the process of extracting a measurement light image includes performing comparison operation with respect to the obtained non-lighting color image and the obtained lighting color image by subtraction.

9. The optical sensor according to claim 1, further comprising a color correcting unit for extracting color information of each pixel photographed by the color photographing element and calculating a distance correction constant for the corresponding pixel in order to correct the distance information of each pixel converted by the distance calculating unit.

10. The sensing method according to claim 6, further comprising:

extracting color information of each pixel photographed by the color photographing element; and calculating a distance correction constant for the corresponding pixel in order to correct the distance information of each pixel converted by a distance calculating unit.

* * * * *